(12) United States Patent
Basheer et al.

(10) Patent No.: US 11,452,986 B2
(45) Date of Patent: Sep. 27, 2022

(54) METHOD OF PRODUCING FLUORINATED CARBON FROM RICE HUSK

(71) Applicant: KING FAHD UNIVERSITY OF PETROLEUM AND MINERALS, Dhahran (SA)

(72) Inventors: Chanbasha Basheer, Dhahran (SA); Isam H. Aljundi, Dhahran (SA); Rashed Saed Bakdash, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 442 days.

(21) Appl. No.: 16/655,914

(22) Filed: Oct. 17, 2019

(65) Prior Publication Data

US 2021/0113987 A1  Apr. 22, 2021

(51) Int. Cl.
*B01D 53/04* (2006.01)
*B01J 20/20* (2006.01)
(Continued)

(52) U.S. Cl.
CPC .............. *B01J 20/20* (2013.01); *B01D 53/04* (2013.01); *B01J 20/2808* (2013.01); *B01J 20/28061* (2013.01); *B01J 20/28064* (2013.01); *B01J 20/28071* (2013.01); *B01J 20/3071* (2013.01); *B01J 20/3078* (2013.01); *B01J 20/3085* (2013.01); *B01D 2253/102* (2013.01);
(Continued)

(58) Field of Classification Search
CPC .............. B01D 2253/102; B01D 53/02; B01D 2253/311; B01D 2257/504; B01D 2255/9205; B01D 2256/245; B01D 2257/304; B01D 53/04; B01D 53/885; B01J 20/20; B01J 20/28011; B01J 21/18
See application file for complete search history.

(56) References Cited

U.S. PATENT DOCUMENTS 5,972,834 A * 10/1999 Ohsaki ............... C01B 3/56
                                                    502/430
9,776,165 B2 * 10/2017 Tour ................. B01J 20/3491

FOREIGN PATENT DOCUMENTS

CN   106219724 A   12/2016
CN   106520071 B    5/2018
(Continued)

OTHER PUBLICATIONS

Khan et al., "Novel sulfonated and fluorinated PEEK membranes for $CO_2$ separation". Separation and Purification Technology, vol. 167, Jul. 14, 2016 (2 pages).
(Continued)

*Primary Examiner* — Sharon Pregler
(74) *Attorney, Agent, or Firm* — Oblon, McClelland, Maier & Neustadt, L.L.P.

(57) ABSTRACT

A method for producing a fluorinated carbon adsorbent which involves digesting rice husk, sulfonating the digested rice husk, and fluorinating the sulfonated rice husk. The method yields a fluorinated carbon adsorbent material having an adsorption capacity for $CO_2$ of 1.6 to 2.5 mmol/g, an adsorption capacity for $CH_4$ of 0.4 to 0.8 mmol/g, and an adsorption capacity for $N_2$ of 0.1 to 0.4 mmol/g, at a temperature of 273 to 298 K and a pressure of 0.75 to 1.5 atm. Also disclosed is a method for separating a mixture of gases using the fluorinated carbon adsorbent.

20 Claims, 3 Drawing Sheets

(51) Int. Cl.
  *B01J 20/30* (2006.01)
  *B01J 20/28* (2006.01)
(52) U.S. Cl.
  CPC .. *B01D 2253/304* (2013.01); *B01D 2253/306* (2013.01); *B01D 2253/311* (2013.01); *B01D 2257/504* (2013.01)

(56) References Cited

FOREIGN PATENT DOCUMENTS

| ID | 201803526 A | 4/2018 |
|---|---|---|
| JP | 1978001194 A | 1/1978 |
| JP | 2014205143 A | 10/2014 |

OTHER PUBLICATIONS

Yu et al., "Effects of fluorination on carbon molecular sieves for $CH_4$/$CO_2$ gas separation behavior", International Journal of Greenhouse Gas Control, vol. 10, Sep. 2012 (2 pages).

Kishore et al., "Synthesis of Activated Carbon from Rice Husk for the Enhancement of Microporosity and Carbon Dioxide Adsorption", International Journal of Innovative Research in Science Engineering and Technology, vol. 6, Issue 12, Dec. 2017 (8 pages).

* cited by examiner

METHOD OF PRODUCING FLUORINATED CARBON FROM RICE HUSK

BACKGROUND OF THE INVENTION

Field of the Invention

The present disclosure relates to a method of preparing a fluorinated carbon adsorbent from rice husk, the fluorinated carbon adsorbent produced by the method, and a method of separating one component gas from a gas mixture or enriching a gas mixture in one of the component gases of the mixture by selective adsorption using the fluorinated carbon adsorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The separation of carbon dioxide from other gases, such as atmosphere, natural gas, or combustion exhaust is of critical importance for current and future technologies. Sequestration of carbon dioxide from the Earth's atmosphere or from combustion exhaust is a strategy for combating climate change. Removal of carbon dioxide from energy source streams, such as natural gas, can enhance the properties of these energy sources during use, for example by increasing combustion efficiency.

One material that has been used as a sorbent to separate carbon dioxide from other gases is activated carbon. Activated carbon is a form of carbon processed to have small, low-volume pores. Activated carbon made or modified for carbon dioxide adsorption has been demonstrated to be effective, but lacks many qualities desirable for this application including expensive or hazardous materials, energy-intensive processing, low adsorption capacity, low separation factor, or lack of reusability. For example, U.S. Pat. No. 9,776,165B2 discloses a porous carbon material for $CO_2$ separation in natural gas, however the method disclosed in the patent involves the introduction of functionalities to the carbon material through the use of organic nitrogen-containing and sulfur-containing moieties that are toxic and environmentally unfriendly and temperatures in excess of 600° C.

The inclusion of halogen elements in an activated carbon material for carbon dioxide material has been shown to be advantageous for use in such an application. For example, U.S. Pat. No. 5,972,834A discloses a chlorinated or brominated carbon material for carbon dioxide adsorption and gas separation.

In view of the forgoing, one object of the present disclosure is to provide methods for producing fluorinated carbon adsorbents using low temperatures and environmentally friendly functionalization reagents. Another object of the present disclosure is to provide fluorinated carbon adsorbents having increased gas separation factors through the systematic introduction of both sulfur and fluorine functionalities.

SUMMARY OF THE INVENTION

The present disclosure relates to a method of making a fluorinated carbon adsorbent involving microwave irradiating a mixture of rice husk and aqueous sulfuric acid at a temperature of 100 to 300° C. to form a digested rice husk, drying and milling the digested rice husk to form a powdered rice husk, microwave irradiating the powdered rice husk in the presence of fuming sulfuric acid to form a sulfonated rice husk, and microwave irradiating the sulfonated rice husk in the presence of hydrofluoric acid (HF) at a temperature of 50 to 150° C. thereby forming the fluorinated carbon adsorbent. The method produced a fluorinated carbon adsorbent that has a carbon content of 60 to 75 wt %, an oxygen content of 14 to 34.5 wt %, a fluorine content of 5 to 9 wt %, a sulfur content of 0.5 to 2 wt %, and a silicon content of less than 0.5 wt %, each relative to a total weight of the fluorinated carbon adsorbent.

In preferred embodiments, the aqueous sulfuric acid has a concentration of 1 to 4.2 M.

In some embodiments, the mixture is microwave irradiated for 1 to 60 minutes.

In some embodiments, the digested rice husk is dried at 30 to 90° C. for 1 to 24 hours.

In some embodiments, the powdered rice husk is microwave irradiated for 1 to 60 minutes.

In some embodiments, the sulfonated rice husk is microwave irradiated for 15 to 90 minutes.

In some embodiments, the method further involves washing the fluorinated carbon adsorbent with distilled water and drying at 50 to 150° C. after forming.

In preferred embodiments, the fluorinated carbon adsorbent has a surface area of 500 to 600 $m^2/g$, a pore volume of 0.1 to 0.3 $cm^3/g$, and a mean pore radius of 0.5 to 0.75 nm.

In preferred embodiments, the fluorinated carbon adsorbent has an adsorption capacity for $CO_2$ of 1.6 to 2.5 mmol/g, an adsorption capacity for $CH_4$ of 0.4 to 0.8 mmol/g, and an adsorption capacity for $N_2$ of 0.1 to 0.4 mmol/g, at a temperature of 273 to 298 K and a pressure of 0.75 to 1.5 atm.

In preferred embodiments, the fluorinated carbon adsorbent has a separation factor for $CO_2/CH_4$ of 2 to 6 and a separation factor for $CO_2/N_2$ of 6 to 16.

In preferred embodiments, the fluorinated carbon adsorbent has reversible gas adsorption and is returned to a state with no adsorbed gas by exposure to a pressure of 0.0001 to 0.1 atm.

The present disclosure also relates to a fluorinated carbon adsorbent derived from fluorinating a sulfonated rice husk having a surface area of 500 to 600 $m^2/g$, a pore volume of 0.1 to 0.3 $cm^3/g$, and a mean pore radius of 0.5 to 0.75 nm.

In some embodiments, the fluorinated carbon adsorbent has a carbon content of 60 to 75 wt %, an oxygen content of 14 to 34.5 wt %, a fluorine content of 5 to 9 wt %, and a sulfur content of 0.5 to 2 wt %, and a silicon content of less than 0.5 wt %, each relative to a total weight of the fluorinated carbon adsorbent.

In preferred embodiments, the fluorinated carbon adsorbent has an adsorption capacity for $CO_2$ of 1.6 to 2.5 mmol/g, an adsorption capacity for $CH_4$ of 0.4 to 0.8 mmol/g, and an adsorption capacity for $N_2$ of 0.1 to 0.4 mmol/g, at a temperature of 273 to 298 K and a pressure of 0.75 to 1.5 atm.

In preferred embodiments, the fluorinated carbon adsorbent has a separation factor for $CO_2/CH_4$ of 2 to 6 and a separation factor for $CO_2/N_2$ of 6 to 16.

In some embodiments, the fluorinated carbon adsorbent has reversible gas adsorption and is returned to a state with no adsorbed gas by exposure to a pressure of 0.0001 to 0.1 atm.

The present disclosure also relates to a method of separating a first gas from a gas mixture comprising the first gas and a second gas, the method involving delivering the gas mixture into a feed side of a chamber comprising the fluorinated carbon adsorbent that divides the chamber into the feed side and a permeate side, such that at least a portion of the first gas permeates the fluorinated carbon adsorbent, and recovering from the permeate side a stream depleted in the first gas compared to the gas mixture.

In preferred embodiments, the first gas is $CO_2$ and the second gas is $N_2$, $CH_4$, or both.

In some embodiments, the gas mixture and the chamber have a temperature of 223 to 348 K and the gas mixture is supplied to the feed side of the chamber at a pressure of 0.75 to 2 atm.

In some embodiments, the method has a separation factor for $CO_2/CH_4$ of 2 to 6 and a separation factor for $CO_2/N_2$ of 6 to 16.

DETAILED DESCRIPTION OF THE INVENTION

Figure 1A:
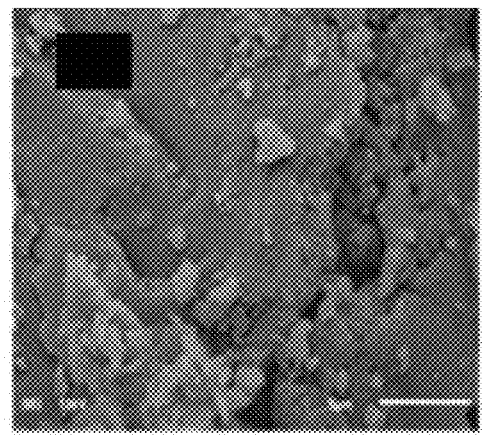
FIG. 1A is a scanning electron microscopy image of the digested rice husk.

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

As used herein, "adsorption" is the adhesion of atoms, ions or molecules from a gas, liquid, or dissolved solid to a surface. The process creates a film of an adsorbate (e.g. the first gas) on the surface of an adsorbent (e.g. the fluorinated carbon adsorbent). Chemisorption is a kind of adsorption which involves a chemical reaction between the adsorbate and adsorbent, i.e., new chemical bonds are generated at the adsorbent surface. In contrast with chemisorption is physisorption, which leaves the chemical species of the adsorbate and adsorbent intact chemically unchanged upon adsorption.

As used herein, "rice husk" (also referred to as "rice hull") refers to the hard, fibrous protecting coverings of grains of rice. Rice husks are a component of the chaff of rice grains removed from the grains before cooking or consumption. Rice refers to the seeds of a plant from the genus *Oryza*, *Zizania*, or *Porteresia*. Examples of rice include *Oryza australiensis*, *Oryza barthii*, *Oryza brachyantha*, *Oryza coarctata*, *Oryza eichingeri*, *Oryza glaberrima* (also known as African rice), *Oryza grandiglumis*, *Oryza latifolia*, *Oryza longiglumis*, *Oryza longistaminata*, *Oryza meyeriana*, *Oryza minuta*, *Oryza neocaledonica*, *Oryza officinalis*, *Oryza punctate*, *Oryza ridleyi*, *Oryza rufipogon* (also known as brownbeard rice or red rice), *Oryza sativa* (also known as Asian rice), and *Oryza schlechteri*. Plants from the genus *Zizania* or *Porteresia* are commonly known as "wild rice". Examples of wild rice include *Zizania palustris* (Northern wild rice), *Zizania aquatica* (Wild rice), *Zizania texana* (Texas wild rice), *Zizania latifola* (Manchurian wild rice), and *Porteresia coarctata*.

Method for Preparing Fluorinated Carbon Adsorbent

According to a first aspect, the present disclosure relates to a method of making a fluorinated carbon adsorbent. Generally, the method uses a rice husk starting material as the carbon source and involves a sequence of microwave irradiation techniques, with digesting, sulfonation, and fluorination steps that utilize environmentally-friendly substances and temperatures below 200° C. One advantage of the disclosed methods is that it uses environmentally-friendly aqueous solutions of inorganic substances to introduce functionalities to the carbon material and that it uses much lower temperatures than other methods disclosed previously. Further, the fluorinated carbon adsorbent has fluorine-containing and sulfur-containing moieties that may confer advantageous properties for gas (e.g., carbon dioxide) separation and/or adsorption.

Any rice husk may be used as starting material (as the carbon source) herein. In preferred embodiments, the rice husk is collected from a plant in the genus *Oryza*, *Zizania*, or *Porteresia*. In preferred embodiments, the rice husk is collected from *Oryza sativa* (Asian rice) or *Oryza glaberrima* (African rice). In alternative preferred embodiments, the rice husk is collected from *Zizania palustris* (Northern wild rice), *Zizania aquatica* (Wild rice), *Zizania texana* (Texas wild rice), or *Zizania latifola* (Manchurian wild rice). In some embodiments, before being used in the method, the rice husk may be milled by a technique such as milling, grinding, ball milling, chopping, pulverizing, crushing, pounding, mincing, shredding, smashing, fragmenting, or another technique that may be used to reduce a material to smaller particles. In some embodiments, the grinding may take place using a mill, ball mill, rod mill, autogenous mill, semi-autogenous grinding mill, pebble mill, buhrstone mill, burr mill, tower mill, vertical shaft impactor mill, grinder, pulverizer, mortar and pestle, blender, crusher, or other implement used to reduce a material to smaller particles. In preferred embodiments, the rice husk is milled to a particle size of 0.01 to 100 µm, preferably 0.025 to 75 µm, preferably 0.05 to 50 µm. In some embodiments, the rice husk may be washed with a wash solvent to remove any impurities before or after the milling step.

In some embodiments, a mixture of rice husk (preferably milled rice husk) and aqueous sulfuric acid is treated under microwave irradiation at a temperature of 100 to 300° C., preferably 125 to 275° C., preferably 150 to 250° C., preferably 175 to 225° C., preferably 200° C. for a time of 1 to 60 minutes, preferably 5 to 55 minutes, preferably 10 to 50 minutes, preferably 15 to 45 minutes, preferably 20 to 40 minutes, preferably 25 to 35 minutes, preferably 30 minutes to form a digested rice husk. In some embodiments, the aqueous sulfuric acid is dilute sulfuric acid. Dilute sulfuric acid is an aqueous mixture of sulfuric acid having a concentration of sulfuric acid less than 4.2 M. In preferred embodiments, the aqueous sulfuric acid has a concentration of 1 to 4.2 M, preferably 1.25 to 4.0 M, preferably 1.5 to 3.5 M, preferably 1.75 to 3 M, preferably 2 M. In preferred embodiments, the rice husk is present in the mixture in an amount of 0.01 to 10 g per mL of aqueous sulfuric acid, preferably 0.1 to 1 g per mL of aqueous sulfuric acid, preferably 0.2 to 0.5 g per mL of aqueous sulfuric acid, preferably 0.25 g per mL of aqueous sulfuric acid. This step may be referred to as a "digestion step".

Following the digestion step, the digested rice husk may be collected by any solid-liquid separation technique known to those of ordinary skill in the art, for example, filtration, decantation, centrifugation, or the like, but excluding techniques such as evaporation. In preferred embodiments, the collected digested rice husk is dried and powdered. In some embodiments, the digested rice husk is dried at 30 to 90° C., preferably 35 to 85° C., preferably 40 to 80° C., preferably 45 to 75° C., preferably 50 to 70° C., preferably 55 to 65° C., preferably 60° C. for 1 to 24 hours, preferably 2 to 22 hours, preferably 3 to 20 hours, preferably 4 to 18 hours, preferably 5 to 16 hours, preferably 6 to 14 hours, preferably 7 to 12 hours. In some embodiments the digested rice husk may be milled by a technique such as milling, grinding, ball milling, chopping, pulverizing, crushing, pounding, mincing, shredding, smashing, fragmenting, or another technique that may be used to reduce a material to smaller particles. In some embodiments, the grinding may take place using a mill, ball mill, rod mill, autogenous mill, semi-autogenous grinding mill, pebble mill, buhrstone mill, burr mill, tower mill, vertical shaft impactor mill, grinder, pulverizer, mortar and pestle, blender, crusher, or other implement used to reduce a material to smaller particles. In preferred embodiments, the digested rice husk is milled to a particle size of 0.01 to 100 µm, preferably 0.025 to 75 µm, preferably 0.05 to 50 µm, preferably 0.075 to 25 µm. In some embodiments, digested rice husk may be washed with a wash solvent to remove any impurities before or after the drying and milling step. After drying and milling, the digested rice husk that has been powdered is referred to as a "powdered rice husk".

In some embodiments, the powdered rice husk has a silicon content of 10 to 30 wt %, preferably 15 to 25 wt %, preferably 16 to 21 wt %, preferably 17 to 20 wt %, preferably 18 to 19 wt % based on a total weight of the powdered rice husk. In some embodiments, the silicon in the powdered rice husk is present as silica.

In some embodiments, the powdered rice husk is microwave irradiated in the presence of fuming sulfuric acid at a temperature 150 to 200° C., preferably 155 to 195° C., preferably 160 to 190° C., preferably 165 to 185° C. for 1 to 60 minutes, preferably 5 to 55 minutes, preferably 10 to 50 minutes, preferably 15 to 45 minutes, preferably 20 to 40 minutes, preferably 25 to 35 minutes, preferably 30 minutes to form a sulfonated rice husk. Fuming sulfuric acid, also known as oleum, is a solution of various compositions of sulfur trioxide in sulfuric acid. Fuming sulfuric acid is generally assessed according to the free $SO_3$ content by mass. In preferred embodiments, the fuming sulfuric acid has a composition of 5 to 65% free $SO_3$, preferably 10 to 50% free $SO_3$, preferably 12.5 to 40% free $SO_3$, preferably 15 to 30% free $SO_3$, preferably 20% free $SO_3$ by mass. In preferred embodiments, the powdered rice husk is present in an amount of 0.01 to 10 g per mL of fuming sulfuric acid, preferably 0.1 to 1 g per mL of fuming sulfuric acid, preferably 0.2 to 0.5 g per mL of fuming sulfuric acid, preferably 0.25 g per mL of fuming sulfuric acid. This step may be referred to as a "sulfonation step".

Following the sulfonation step, the sulfonated rice husk may be collected by any solid-liquid separation technique known to those of ordinary skill in the art, for example, filtration, decantation, centrifugation, or the like, but excluding techniques such as evaporation. In preferred embodiments, the collected sulfonated rice husk is dried. In some embodiments, the sulfonated rice husk is dried at 100 to 200° C., preferably 115 to 185° C., preferably 125 to 175° C., preferably 135 to 165° C., preferably 140 to 160° C., preferably 150° C. for 1 to 24 hours, preferably 2 to 22 hours, preferably 3 to 20 hours, preferably 4 to 18 hours, preferably 5 to 16 hours, preferably 6 to 14 hours, preferably 7 to 12 hours. In some embodiments the sulfonated rice husk may optionally be powdered. In some embodiments, the sulfonated rice husk may be milled by a technique such as milling, grinding, ball milling, chopping, pulverizing, crushing, pounding, mincing, shredding, smashing, fragmenting, or another technique that may be used to reduce a material to smaller particles. In some embodiments, the grinding may take place using a mill, ball mill, rod mill, autogenous mill, semi-autogenous grinding mill, pebble mill, buhrstone mill, burr mill, tower mill, vertical shaft impactor mill, grinder, pulverizer, mortar and pestle, blender, crusher, or other implement used to reduce a material to smaller particles. In preferred embodiments, the sulfonated rice husk is milled to a particle size of 0.1 to 10 µm, preferably 0.25 to 7.5 µm, preferably 0.5 to 5 µm. In some embodiments, sulfonated rice husk may optionally be washed with a wash solvent to remove any impurities before or after the drying or optional milling step.

In some embodiments, the sulfonated rice husk has a silicon content of 1 to 25 wt %, preferably 5 to 15 wt %, preferably 6 to 13 wt %, preferably 7 to 12 wt %, preferably 8 to 11 wt %, preferably 9 to 10 wt % based on a total weight of the sulfonated rice husk. In some embodiments, the silicon in the sulfonated rice husk is present as silica.

In some embodiments, the sulfonated rice husk is microwave irradiated in the presence of hydrofluoric acid a temperature of 50 to 150° C., preferably 60 to 140° C., preferably 70 to 130° C., preferably 80 to 120° C., preferably 90 to 110° C., preferably 100° C. for 15 to 90 minutes, preferably 20 to 85 minutes, preferably 25 to 80 minutes, preferably 30 to 75 minutes, preferably 35 to 70 minutes, preferably 40 to 60 minutes, preferably 45 minutes to form a fluorinated carbon adsorbent. In preferred embodiments, the hydrofluoric acid is aqueous hydrofluoric acid. In preferred embodiments, the hydrofluoric acid has a concentration of 0.4 to 51%, preferably 1 to 48%, preferably 2 to 45%, preferably 3 to 40%, preferably 5 to 15%, preferably 8% in water by mass. In preferred embodiments, the sulfonated rice husk is present in an amount of 0.001 to 1 g per mL of hydrofluoric acid, preferably 0.01 to 0.5 g per mL of hydrofluoric acid, preferably 0.025 to 0.25 g per mL of hydrofluoric acid. This step may be referred to as a "fluorination step".

Following the fluorination step, the fluorinated carbon adsorbent may be collected by any solid-liquid separation technique known to those of ordinary skill in the art, for example, filtration, decantation, centrifugation, or the like, but excluding techniques such as evaporation. In preferred embodiments, the collected fluorinated carbon adsorbent is dried. In some embodiments, the fluorinated carbon adsorbent is dried at 50 to 150° C., preferably 55 to 145° C., preferably 60 to 140° C., preferably 65 to 135° C., preferably 70 to 130° C., preferably 75 to 125° C., preferably 80 to 120° C., preferably 85 to 115° C., preferably 90 to 110° C., preferably 95 to 105° C., preferably 100° C. for 1 to 24 hours, preferably 2 to 22 hours, preferably 3 to 20 hours, preferably 4 to 18 hours, preferably 5 to 16 hours, preferably 6 to 14 hours, preferably 7 to 12 hours. In some embodiments the fluorinated carbon adsorbent may optionally be powdered. In some embodiments, the fluorinated carbon adsorbent may be milled by a technique such as milling, grinding, ball milling, chopping, pulverizing, crushing, pounding, mincing, shredding, smashing, fragmenting, or another technique that may be used to reduce a material to smaller particles. In some embodiments, the grinding may take place using a mill, ball mill, rod mill, autogenous mill, semi-autogenous grinding mill, pebble mill, buhrstone mill, burr mill, tower mill, vertical shaft impactor mill, grinder, pulverizer, mortar and pestle, blender, crusher, or other implement used to reduce a material to smaller particles. In preferred embodiments, the fluorinated carbon adsorbent is milled to a particle size of 0.1 to 4 µm, preferably 0.25 to 3.5 µm, preferably 0.5 to 3 µm, preferably 0.75 to 2.5 µm. In some embodiments, fluorinated carbon adsorbent is washed with a wash solvent to remove any impurities before the drying step. In preferred embodiments, the wash solvent is ultrapure water.

Fluorinated Carbon Adsorbent

In preferred embodiments, the fluorinated carbon adsorbent has a carbon content of 60 to 75 wt %, preferably 62.5 to 70 wt %, preferably 63 to 67 wt %, an oxygen content of 14 to 34.5 wt %, preferably 18 to 32.5 wt %, preferably 22 to 30.5 wt %, preferably 26 to 28.5 wt %, preferably 27.5 to 27.75 wt %, a fluorine content of 5 to 9 wt %, preferably 5.5 to 8 wt %, preferably 6 to 7.5 wt % preferably 6.5 wt %, and a sulfur content of 0.5 to 2 wt %, preferably 0.75 to 1.75 wt %, preferably 0.9 to 1.5 wt %, preferably 1 wt %, each relative to a total weight of the fluorinated carbon adsorbent. In preferred embodiments, the fluorinated carbon adsorbent has a silicon content less than 0.5 wt %, preferably less than 0.4 wt %, preferably less than 0.3 wt %, preferably less than 0.2 wt %, preferably less than 0.1 wt % relative to a total weight of the fluorinated carbon adsorbent. In preferred embodiments, silicon is not present in the fluorinated carbon adsorbent.

In preferred embodiments, the fluorinated carbon adsorbent is porous. In preferred embodiments, the fluorinated carbon adsorbent has pores that have a pore volume of 0.100 to 0.300 $cm^3/g$, preferably 0.110 to 0.290 $cm^3/g$, preferably 0.120 to 0.280 $cm^3/g$, preferably 0.130 to 0.270 $cm^3/g$, preferably 0.140 to 0.260 $cm^3/g$, preferably 0.150 to 0.250 $cm^3/g$, preferably 0.160 to 0.240 $cm^3/g$, preferably 0.170 to 0.230 $cm^3/g$, preferably 0.180 to 0.220 $cm^3/g$. In preferred embodiments, the fluorinated carbon adsorbent has pores that have a mean pore radius of 0.5 to 0.75 nm, preferably 0.55 to 0.7 nm, preferably 0.6 to 0.65 nm. In preferred embodiments, the presence and nature of the pores in the fluorinated carbon adsorbent increase the surface area of the fluorinated carbon adsorbent. In preferred embodiments, the fluorinated carbon adsorbent has a surface area of 500 to 600 $m^2/g$, preferably 510 to 550 $m^2/g$, preferably 515 to 545 $m^2/g$, preferably 520 to 535 $m^2/g$.

In preferred embodiments, the fluorinated carbon adsorbent has a particle size of 0.1 to 4 µm, preferably 0.25 to 3.5 µm, preferably 0.5 to 3 µm, preferably 0.75 to 2.5 µm. The particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, or some other shape.

In one embodiment, the particles of fluorinated carbon adsorbent may be substantially spherical, meaning that the distance from the particle centroid (center of mass) to anywhere on the nanoparticle outer surface varies by less than 30%, preferably by less than 20%, more preferably by less than 10% of the average distance.

In some embodiments, the particles of fluorinated carbon adsorbent are in the form of blocks, flakes, granules or angular chunks, having an average diameter in a range as previously described and having a large dimension that is 50 to 500%, preferably 75 to 400, preferably 100 to 350%, preferably 150 to 250% of the range previously described and a small dimension that is 5 to 150, preferably 10 to 125, preferably 15 to 100, preferably 25 to 75% of the range previously described. In one embodiment, the fluorinated carbon adsorbent is in the form of flakes with an irregularly-shaped, angular perimeter.

In one embodiment, the fluorinated carbon adsorbent may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the particles of fluorinated carbon adsorbent having a mean diameter as previously described.

The porosity and surface area of the fluorinated carbon adsorbent may be advantageous for the adsorption of gases. In preferred embodiments, the fluorinated carbon adsorbent has an adsorption capacity for carbon dioxide of 1.60 to 2.50 mmol/g, preferably 1.80 to 2.15 mmol/g at a pressure of 1 atm and a temperature of 270 to 300 K, preferably 273 to 298 K. In preferred embodiments the adsorption capacity for carbon dioxide is 1.60 to 2.00 mmol/g, preferably 1.65 to 1.95 mmol/g, preferably 1.70 to 1.90 mmol/g, preferably 1.75 to 1.85 mmol/g at a pressure of 1 atm and a temperature of 290 to 300 K, preferably 298 K. In preferred embodiments, the adsorption capacity for carbon dioxide is 2.0 to 2.5 mmol/g, preferably 2.05 to 2.40 mmol/g, preferably 2.10 to 2.25 mmol/g at a pressure of 1 atm and a temperature of 270 to 280 K, preferably 273 K.

In preferred embodiments, the fluorinated carbon adsorbent has an adsorption capacity for methane of 0.40 to 0.80 mmol/g, preferably 0.50 to 0.65 mmol/g at a pressure of 1 atm and a temperature of 270 to 300 K, preferably 273 to 298 K. In preferred embodiments the adsorption capacity for methane is 0.40 to 0.65 mmol/g, preferably 0.45 to 0.60 mmol/g, preferably 0.55 to 0.59 mmol/g at a pressure of 1 atm and a temperature of 290 to 300 K, preferably 298 K. In preferred embodiments, the adsorption capacity for methane is 0.60 to 0.80 mmol/g, preferably 0.61 to 0.75 mmol/g, preferably 0.62 to 0.70 mmol/g at a pressure of 1 atm and a temperature of 270 to 280 K, preferably 273 K.

In preferred embodiments, the fluorinated carbon adsorbent has an adsorption capacity for nitrogen of 0.10 to 0.40 mmol/g, preferably 0.15 to 0.25 mmol/g at a pressure of 1 atm and a temperature of 270 to 300 K, preferably 273 to 298 K. In preferred embodiments the adsorption capacity for nitrogen is 0.10 to 0.20 mmol/g, preferably 0.11 to 0.19 mmol/g, preferably 0.12 to 0.18 mmol/g, preferably 0.13 to 0.17 mmol/g at a pressure of 1 atm and a temperature of 290 to 300 K, preferably 298 K. In preferred embodiments, the adsorption capacity for nitrogen is 0.15 to 0.40 mmol/g, preferably 0.20 to 0.30 mmol/g, preferably 0.21 to 0.27 mmol/g at a pressure of 1 atm and a temperature of 270 to 280 K, preferably 273 K.

In preferred embodiments, the fluorinated carbon adsorbent has a separation factor for $CO_2/CH_4$ of 2 to 6, preferably 2.5 to 5.5, preferably 3 to 5, preferably 3.5 to 4.5, preferably 4 and a separation factor for $CO_2/N_2$ of 6 to 16, preferably 7 to 15, preferably 8 to 14, preferably 9 to 13, preferably 10 to 12.5, preferably 12. As used herein, the separation factor is a ratio of the adsorption capacity for one gas to the adsorption capacity for the second gas. In the embodiments described here, the fluorinated carbon adsorbent has a higher adsorption capacity for $CO_2$ than for $CH_4$ or $N_2$ and, thus the separation factor considers $CO_2$ as the first gas and the separation factor is a number greater than one.

Method for Recovering a Gas from a Gas Mixture

A third aspect of the disclosure relates to a method for separating a first gas from a gas mixture using the fluorinated carbon adsorbent described above. In some embodiments, the gas mixture contains only a first gas and a second gas. In some embodiments, the gas mixture comprises a first gas and a plurality of other gases. In preferred embodiments, the method comprises delivering a mixture into a feed side of a chamber comprising the fluorinated carbon adsorbent of claim 12 that divides the chamber into the feed side and a permeate side, such that at least a portion of the first gas permeates the fluorinated carbon adsorbent and recovering from the permeate side a stream depleted in the first gas compared to the gas mixture.

In terms of the present disclosure, the adsorption interaction between the first gas and the fluorinated carbon adsorbent may be chemisorption, physisorption, or mixtures thereof. In at least one embodiment, the first gas is adsorbed onto the fluorinated carbon adsorbent via a physisorption process, meaning the process is primarily physical and preferably no chemical changes occur on the fluorinated carbon adsorbent or the first gas molecules.

The chamber used for the present method may be of any shape so long as the fluorinated carbon adsorbent can be securely housed and utilized inside the chamber to accomplish the gas adsorption and gas mixture separation. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a vacuum pump to provide vacuum or a reduced pressure to the permeate side.

The fluorinated carbon adsorbent may be freestanding or supported on or within a substrate, for example, a column. Examples of freestanding or supported fluorinated carbon adsorbent include materials and geometries where the fluorinated carbon adsorbent is supported within a fixed bed, a static packed bed, a fluidized bed, embedded in a porous support (such as a porous polymer matrix), in or on a ceramic support, in or on a polymer support, or in or on a silica support.

In some embodiments, the contacting is performed by passing the gas mixture through the fluorinated carbon adsorbent. In some embodiments, the fluorinated carbon adsorbent may be used in series with other currently known adsorption materials to enrich or isolate a targeted gas from a gas mixture.

In one or more embodiments, a force is provided to deliver the gas mixture into contact with the fluorinated carbon adsorbent. Alternatively, the gas mixture may stay stagnant over the fluorinated carbon adsorbent (i.e. as an atmosphere to the fluorinated carbon adsorbent). In one embodiment, the gas mixture introduced into contact with the fluorinated carbon adsorbent has a pressure of 0.75 to 2 atm, preferably 0.9 to 1.5 atm, preferably 0.95 to 1.25 atm, preferably 1 atm. In a related embodiment, the gas mixture introduced has a temperature of 223 to 348 K, preferably 233 to 338 K, preferably 243 to 328 K, preferably 253 to 318 K, preferably 273 to 308 K, preferably 280 to 300 K, preferably 298 K.

In preferred embodiments, the first gas is carbon dioxide ($CO_2$). In a related embodiment, the gas mixture contains the first gas (i.e. $CO_2$) and a second gas which comprises one or more other gaseous substances including, but not limited to, nitrogen, hydrogen, oxygen, carbon monoxide, hydrocarbons having 1-4 carbon atoms (e.g. methane, ethane, ethylene, acetylene, propane, propylene, butane, iso-butane), nitrogen oxides (i.e. nitric oxide, nitrous oxide, nitrogen dioxide), and noble gases (e.g. helium, neon, argon, krypton, xenon). In preferred embodiments, the second gas is $N_2$. In one embodiment, a volumetric ratio of the first gas (e.g. $CO_2$) to the second gas present in the gas mixture is in the range of 1:50 to 5:1, preferably 1:40 to 4:1, preferably 1:30 to 3:1, preferably 1:20 to 2:1, preferably 1:12 to 1:1. In other preferred embodiments, the second gas is methane. In one embodiment, a volumetric ratio of the first gas to the second gas present in the gas mixture is 1:50 to 5:1, preferably 1:40 to 4:1, preferably 1:30 to 3:1, preferably 1:20 to 2:1, preferably 1:12 to 1.5:1, preferably 1:4 to 1:1. In other preferred embodiments, the second gas is a mixture of nitrogen and methane. In some embodiments, the ratio of the amount of nitrogen to the amount of methane in the second gas is 1:50 to 50:1, preferably 1:40 to 40:1, preferably 1:30 to 30:1, preferably 1:20 to 20:1, preferably 1:10 to 10:1.

In some embodiments, the fluorinated carbon adsorbent is activated through a degassing procedure performed in a sub-atmospheric pressure of 0.0001 to 0.1 atm, 0.001 to 0.05 atm, or 0.01-0.02 atm, prior to contacting the fluid mixture.

The fluorinated carbon adsorbent may be degassed at a temperature in the range of 10 to 300° C., 25 to 200° C., 50 to 150° C., or about 100° C. for 1 to 48 hours, 2 to 36 hours, 8 to 24 hours, or 12 to 18 hours.

A stream depleted in the first gas may be obtained after the first gas is adsorbed onto the fluorinated carbon adsorbent, and/or after the second gas permeates the fluorinated carbon adsorbent. A composition of the stream depleted in the first gas may vary depending on the composition of the gas mixture. In preferred embodiments, the method using the fluorinated carbon adsorbent has a separation factor for $CO_2/CH_4$ of 2 to 6, preferably 2.5 to 5.5, preferably 3 to 5, preferably 3.5 to 4.5, preferably 4 and a separation factor for $CO_2/N_2$ of 6 to 16, preferably 7 to 15, preferably 8 to 14, preferably 9 to 13, preferably 10 to 12.5, preferably 12.

In some embodiments, the stream depleted in the first gas includes the first gas and the second gas. In one or more embodiments, a volumetric ratio of the first gas (e.g. $CO_2$) to the second gas present in the stream depleted in the first gas is at least 25% less than that present in the fluid mixture, preferably at least 30% less, preferably at least 40% less, preferably at least 50% less, preferably at least 60% less, preferably at least 70% less, preferably at least 80% less, preferably at least 90% less, preferably at least 95% less than that present in the fluid mixture. In a preferred embodiment, the stream depleted in the first gas is substantially free of the first gas, for example, the stream contains less than 100 ppm, preferably less than 10 ppm, preferably less than 1 ppm, preferably less than 1 ppb of the first gas. In a most preferred embodiment, the stream depleted in the first gas is devoid of the first gas.

In one or more embodiments, the method of the present disclosure further involves desorbing the first gas from the first gas loaded fluorinated carbon adsorbent, and reusing the fluorinated carbon adsorbent. Preferably, the method involves desorbing the first gas (e.g. $CO_2$) from the first gas loaded fluorinated carbon adsorbent by flowing or purging an inert gas such as nitrogen ($N_2$), helium, and argon over the first gas loaded fluorinated carbon adsorbent to regenerate the fluorinated carbon adsorbent and reusing the fluorinated carbon adsorbent. In another preferred embodiment, desorbing the first gas (e.g. $CO_2$) from the first gas loaded fluorinated carbon adsorbent is performed by subjecting the first gas loaded fluorinated carbon adsorbent to a vacuum or a sub-atmospheric pressure of 0.0001 to 1 atm, 0.001 to 0.1 atm, or 0.01 to 0.02 atm, prior to contacting the fluid mixture. The desorbing may take place at a temperature in the range of 0 to 300° C., preferably 5 to 200° C., preferably 7.5 to 100° C., preferably 10 to 30° C., for 0.5 to 7.5 hours, preferably 1 to 5 hours, preferably 1.5 to 4.5 hours, preferably 2 to 4 hours. The fluorinated carbon adsorbent of the present disclosure may be regenerated (i.e. desorbed) and reused up to 3 cycles without a loss in the first gas (e.g. $CO_2$) uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles. The examples below are intended to further illustrate protocols for preparing and characterizing the fluorinated carbon adsorbent discussed above and for assessing the gas adsorption properties of said fluorinated carbon adsorbent and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

Examples

Preparation of RH, SRH, and FRH

The rice husk was washed and ground, and then 5 g of RH was mixed with 20 mL of 2 M $H_2SO_4$ in Teflon autoclave and digested in the microwave at 200° C. for 30 min. The sample was cooled and kept overnight in the oven at 60° C. for drying, followed by milling into a fine powder. The fine powder was blended with 20 ml of 20% $SO_3$ fuming $H_2SO_4$ in the microwave reactor for sulfonation for 30 min. After cooling to 40° C., the sulfonated rice husk (SRH) was dried overnight at 150° C. Subsequently, 1 g of SRH was mixed with hydrofluoric acid (between 8-40%) in a Teflon autoclave and reacted in a microwave at 100° C. for 45 min. The produced fine carbon (fluorinated rice husk, FRH) was washed with ultrapure water and dried in the oven at 100° C. Preliminary experiments were conducted to determine appropriate volumes of HF, with 8.0% being sufficient to remove the silica from SRH completely.

Figure 1B:
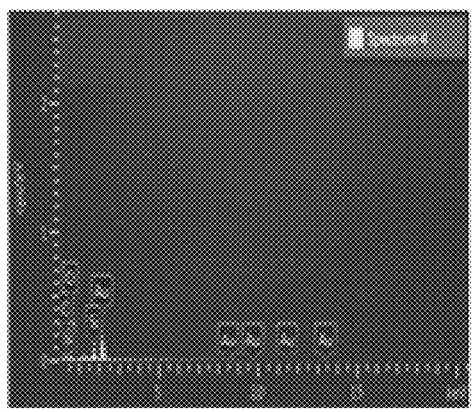
FIG. 1B shows the energy dispersive x-ray spectrum of the digested rice husk.
Figure 2A:
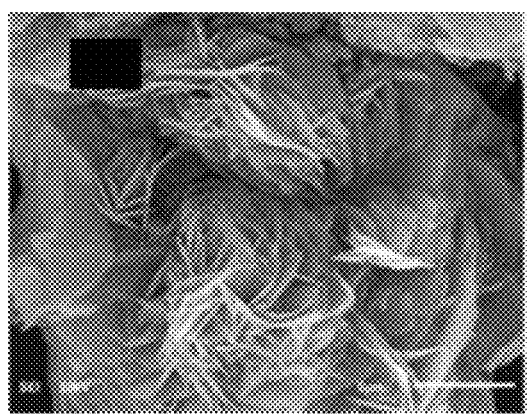
FIG. 2A is a scanning electron microscopy image of the sulfonated rice husk.
Figure 2B:
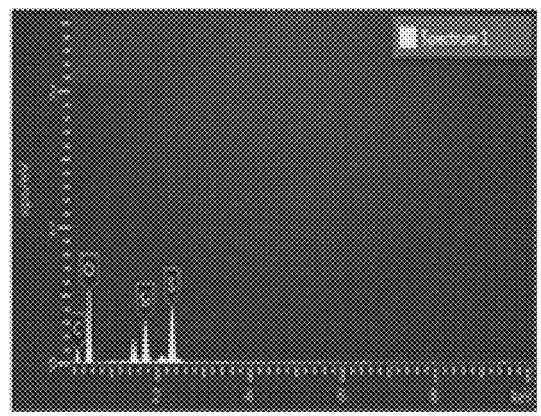
FIG. 2B shows the energy dispersive x-ray spectrum of the sulfonated rice husk.
Figure 3A:
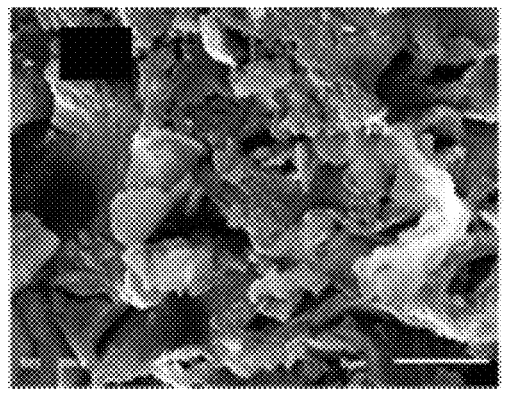
FIG. 3A is a scanning electron microscopy image of the fluorinated carbon adsorbent.
Figure 3B:
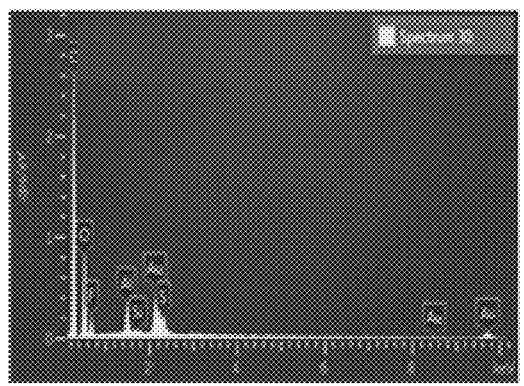
FIG. 3B shows the energy dispersive x-ray spectrum of the fluorinated carbon adsorbent.

Scanning electron microscope (SEM) and Energy Dispersive X-ray (EDX) analysis of RH (FIG. 1A-1B), SRH (FIG. 2A-2B), and FRH (FIG. 3A-3B) shows the morphology and elemental composition of the starting material and the produced carbonaceous materials. SEM images revealed that the starting material has a smooth surface of large and small aggregates while the sulfonated material has a hierarchical structure that was destroyed after fluorination to form the final FRH. The EDX analysis of RH, SRH, and FRH samples shows that the starting RH has a significant content of carbon (43.8%), oxygen (35.2%), and silicon (18.4%). The SRH analysis displays an oxygen content of 44.1%, silicon 9.1% and sulfur 5.9%. These results demonstrate that the sulfur was introduced to RH structure after the microwave carbonization process and high concentration of silica was still present in SRH. The analysis shows that final carbon material (FRH) contains: oxygen 27.6%, sulfur 1%, silicon 0.1%, and fluorine 6.5%.

Figure 4:
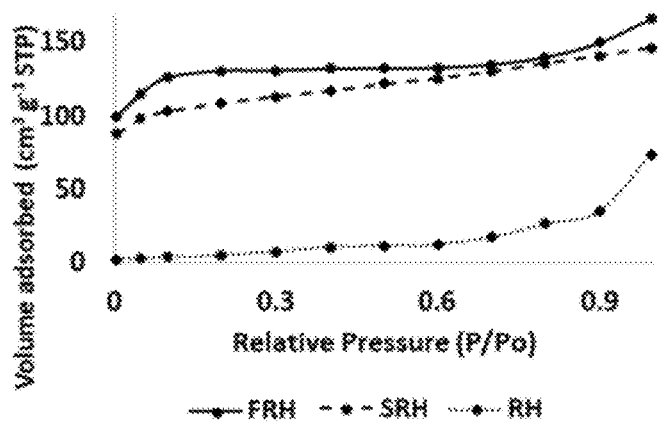
FIG. 4 shows the nitrogen adsorption isotherms at 77 K for the digested rice husk (RH), sulfonated rice husk (SRH), and fluorinated carbon adsorbent (FRH).

The Nitrogen adsorption experiments (FIG. 4) at a temperature of 77 K revealed that the surface area of the starting RH material was very small (29.8 $m^2/g$) compared to that of the produced FRH (531.3 $m^2/g$). Further analysis of the structural characteristics is shown in Table 1.

TABLE 1

Structural properties of the starting and the produced materials.

| Sample | Surface area ($m^2/g$) | Pore volume ($cm^3/g$) | Mean pore radius (nm) |
|---|---|---|---|
| RH | 29.8 | 0.053 | 3.099 |
| SRH | 410.9 | 0.209 | 0.785 |
| FRH | 531.3 | 0.196 | 0.614 |

Figure 5:
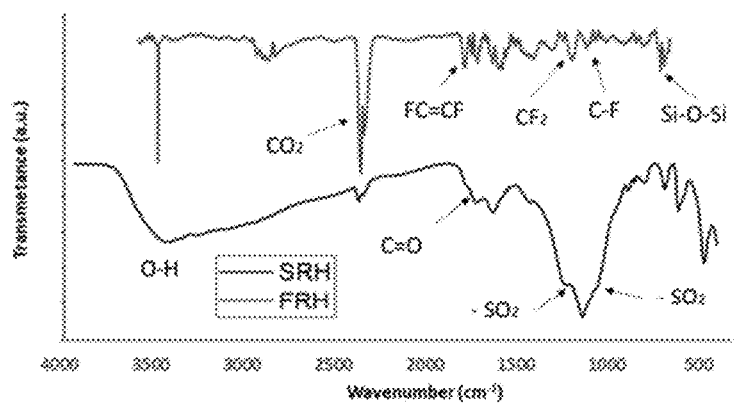
FIG. 5 shows the Fourier transform infrared (FTIR) spectrum of the sulfonated rice husk (SRH) and fluorinated carbon adsorbent (FRH).

The spectroscopic analysis of SRH and FRH samples (FIG. 5) showed the absorption bands as described in Table 2 which confirmed the successful sulfonation and fluorination procedures.

TABLE 2

The major absorption bands observed from the FTIR spectra.

| Absorption | Assignment |
|---|---|
| 1036 (SRH) | —$SO_2$ |
| 1162 (SRH) | —$SO_2$ |
| 1182 (FRH) | CF |
| 1190 (FRH) | $CF_2$ |
| 749 (FRH) | CF |
| 1726 (FRH) | FC=CF |
| 1766 (FRH) | $F_2$C=CF |

Figure 6A:
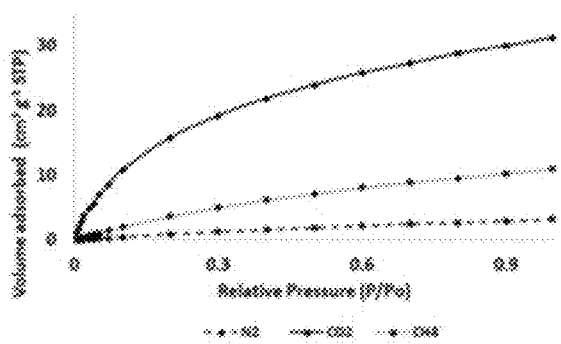
FIG. 6A shows the adsorption isotherms for different gases of the sulfonated rice husk at a temperature of 298 K.
Figure 6B:
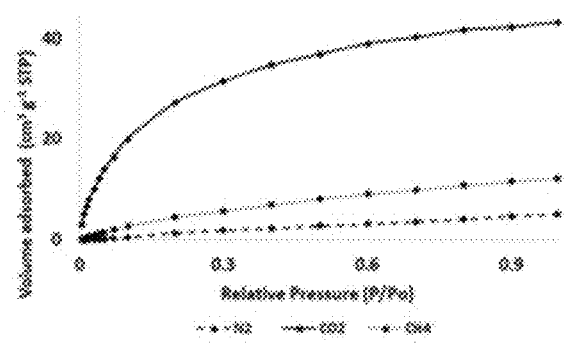
FIG. 6B shows the adsorption isotherms for different gases of the sulfonated rice husk at a temperature of 273 K.
Figure 7A:
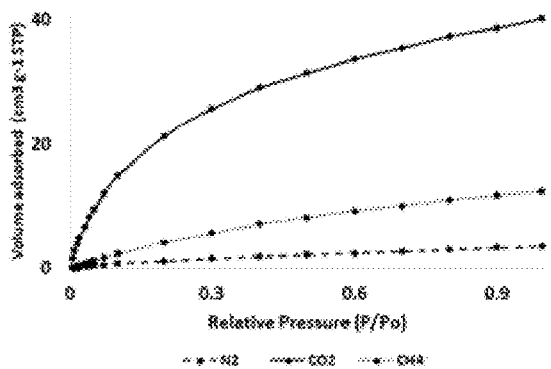
FIG. 7A shows the adsorption isotherms for different gases of the fluorinated carbon adsorbent at a temperature of 298 K.
Figure 7B:
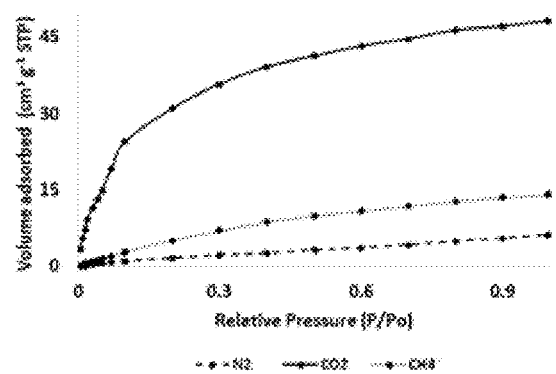
FIG. 7B shows the adsorption isotherms for different gases of the fluorinated carbon adsorbent at a temperature of 273 K.

The adsorption isotherms of the prepared materials are shown in FIGS. 6A and 6B for the SRH and FIGS. 7A and 7B for the FRH. The figures show that the both materials have higher affinity for $CO_2$ adsorption over methane adsorption which make it good candidate for adsorptive separation applications; e.g. natural gas separation.

Figure 8A:
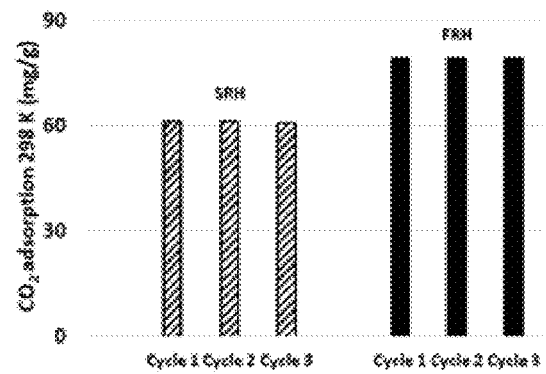
FIG. 8A shows the adsorption capacity for $CO_2$ of the sulfonated rice husk (SRH) and fluorinated carbon adsorbent (FRH) after cycles of adsorption and regeneration.
Figure 8B:
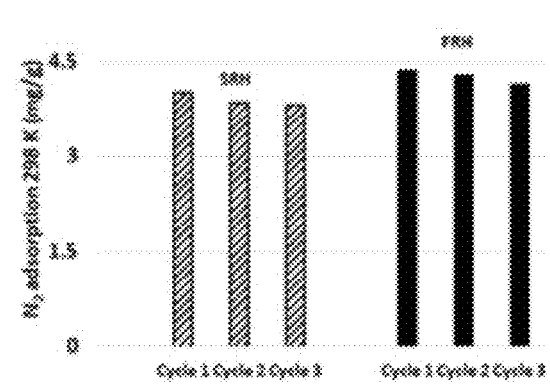
FIG. 8B shows the adsorption capacity for $N_2$ of the sulfonated rice husk (SRH) and fluorinated carbon adsorbent (FRH) after cycles of adsorption and regeneration.
Figure 8C:
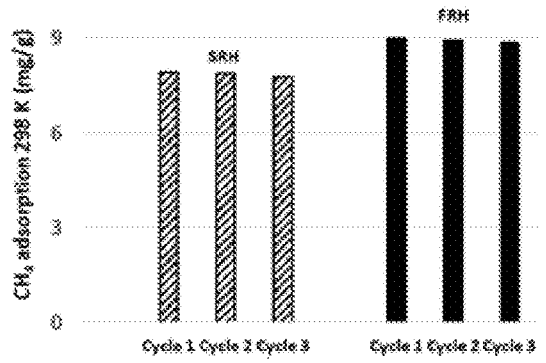
FIG. 8C shows the adsorption capacity for $CH_4$ of the sulfonated rice husk (SRH) and fluorinated carbon adsorbent (FRH) after cycles of adsorption and regeneration.

The adsorption capacity of the prepared carbon adsorbents for different gases was measured at different temperatures (77 K, 273 K, 298 K) as shown in Table 3. The fluorinated carbon (FRH) showed a good adsorption capacity for carbon dioxide even at room temperature. This adsorption capacity will not diminish with repetitive usage of this adsorbent since simple desorption at low pressure will restore the adsorption capacity of the virgin material. This behavior was demonstrated using SRH and FRH using $CO_2$, $CH_4$, and $N_2$ for three cycles as shown in FIG. 8.

TABLE 3

Adsorption capacity of SRH, FRH for $CO_2$, $CH_4$, and $N_2$ at different temperatures.

| Sample | Temperature (K) | Pressure (atm) | Adsorption capacity for $CO_2$ (mmol/g) | Adsorption capacity for $CH_4$ (mmol/g) | Adsorption capacity for $N_2$ (mmol/g) |
|---|---|---|---|---|---|
| SRH | 298 | 1 | 1.40 | 0.49 | 0.14 |
|  | 273 | 1 | 1.93 | 0.54 | 0.23 |
|  | 77 | 1 | — | — | 6.5 |
| FRH | 298 | 1 | 1.80 | 0.56 | 0.16 |
|  | 273 | 1 | 2.14 | 0.63 | 0.28 |
|  | 77 | 1 | — | — | 7.4 |

The invention claimed is:

1. A method of making a fluorinated carbon adsorbent, the method comprising:
   microwave irradiating a mixture of rice husk and aqueous sulfuric acid to a temperature of 100 to 300° C. to form a digested rice husk;
   drying and milling the digested rice husk to form a powdered rice husk;
   microwave irradiating the powdered rice husk in the presence of fuming sulfuric acid to form a sulfonated rice husk; and
   microwave irradiating the sulfonated rice husk in the presence of hydrofluoric acid (HF) to a temperature of 50 to 150° C. thereby forming the fluorinated carbon adsorbent;
   wherein the fluorinated carbon adsorbent has a carbon content of 60 to 75 wt %, an oxygen content of 14 to 34.5 wt %, a fluorine content of 5 to 9 wt %, a sulfur content of 0.5 to 2 wt %, and a silicon content of less than 0.5 wt %, each relative to a total weight of the fluorinated carbon adsorbent.

2. The method of claim 1, wherein the aqueous sulfuric acid has a concentration of 1 to 4.2 M.

3. The method of claim 1, wherein the mixture is microwave irradiated for 1 to 60 minutes.

4. The method of claim 1, wherein the digested rice husk is dried at 30 to 90° C. for 1 to 24 hours.

5. The method of claim 1, wherein the powdered rice husk is microwave irradiated for 1 to 60 minutes.

6. The method of claim 1, wherein the sulfonated rice husk is microwave irradiated for 15 to 90 minutes.

7. The method of claim 1, further comprising washing the fluorinated carbon adsorbent with distilled water and drying at 50 to 150° C. after forming.

8. The method of claim 1, wherein the fluorinated carbon adsorbent has a surface area of 500 to 600 $m^2/g$, a pore volume of 0.1 to 0.3 $cm^3/g$, and a mean pore radius of 0.5 to 0.75 nm.

9. The method of claim 1, wherein the fluorinated carbon adsorbent has an adsorption capacity for $CO_2$ of 1.6 to 2.5 mmol/g, an adsorption capacity for $CH_4$ of 0.4 to 0.8 mmol/g, and an adsorption capacity for $N_2$ of 0.1 to 0.4 mmol/g, at a temperature of 273 to 298 K and a pressure of 0.75 to 1.5 atm.

10. The method of claim 1, wherein the fluorinated carbon adsorbent has a separation factor for $CO_2/CH_4$ of 2 to 6 and a separation factor for $CO_2/N_2$ of 6 to 16.

11. The method of claim 1, wherein the fluorinated carbon adsorbent has reversible gas adsorption and is returned to a state with no adsorbed gas by exposure to a pressure of 0.0001 to 0.1 atm.

12. A fluorinated carbon adsorbent obtained by fluorinating a sulfonated rice husk, wherein the fluorinated carbon adsorbent has a surface area of 500 to 600 $m^2/g$, a pore volume of 0.1 to 0.3 $cm^3/g$, and a mean pore radius of 0.5 to 0.75 nm.

13. The fluorinated carbon adsorbent of claim 12, which has a carbon content of 60 to 75 wt %, an oxygen content of 14 to 34.5 wt %, a fluorine content of 5 to 9 wt %, and a sulfur content of 0.5 to 2 wt %, and a silicon content of less than 0.5 wt %, each relative to a total weight of the fluorinated carbon adsorbent.

14. The fluorinated carbon adsorbent of claim 12, which has an adsorption capacity for $CO_2$ of 1.6 to 2.5 mmol/g, an adsorption capacity for $CH_4$ of 0.4 to 0.8 mmol/g, and an adsorption capacity for $N_2$ of 0.1 to 0.4 mmol/g, at a temperature of 273 to 298 K and a pressure of 0.75 to 1.5 atm.

15. The fluorinated carbon adsorbent of claim 12, which has a separation factor for $CO_2/CH_4$ of 2 to 6 and a separation factor for $CO_2/N_2$ of 6 to 16.

16. The fluorinated carbon adsorbent of claim 12, which has reversible gas adsorption and is returned to a state with no adsorbed gas by exposure to a pressure of 0.0001 to 0.1 atm.

17. A method of separating a first gas from a gas mixture comprising the first gas and a second gas, the method comprising:
   delivering the gas mixture into a feed side of a chamber comprising the fluorinated carbon adsorbent of claim 12 that divides the chamber into the feed side and a permeate side, such that at least a portion of the first gas permeates the fluorinated carbon adsorbent; and
   recovering from the permeate side a stream depleted in the first gas compared to the gas mixture.

18. The method of claim 17, wherein the first gas is $CO_2$ and the second gas is $N_2$, $CH_4$, or both.

19. The method of claim 17, wherein the gas mixture and the chamber have a temperature of 223 to 348 K and the gas mixture is supplied to the feed side of the chamber at a pressure of 0.75 to 2 atm.

20. The method of claim 18, which has a separation factor for $CO_2/CH_4$ of 2 to 6 and a separation factor for $CO_2/N_2$ of 6 to 16.

* * * * *